Patented Aug. 10, 1943

2,326,702

UNITED STATES PATENT OFFICE 2,326,702

ETHERS

Fred Lowell Taylor and Clarence L. Moyle, Midland, Mich., assignors to The Dow Chemical Company, Midland, Mich., a corporation of Michigan No Drawing. Application December 23, 1940,
Serial No. 371,404

3 Claims. (Cl. 260—613)

This invention concerns certain new aromaticoxy-halo-dialkyl ethers and is particularly concerned with those compounds having the formula

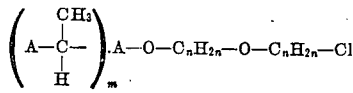

wherein A represents an aromatic radical of the benzene series, $m$ is an integer not greater than 3, and $n$ is an integer from 2 to 4, inclusive. The aromatic radicals designated by A in the above formula are shown by the hereinafter disclosed compounds as being phenyl and homologs and analogs of phenyl wherein one or more of the hydrogen atoms of the benzene ring are replaced by such radicals as halo, alkyl, aralkyl, cycloalkyl, aryl, alkoxy, nitro, carbalkoxy, etc. None of these ether compounds include phenyl structures comprising radicals such as hydroxyl, carboxyl, and amino which are recognized as being readily reacted upon by acid or alkalies.

We have prepared and identified a number of compounds falling under the above formula and found them to be viscous, high-boiling liquids, substantially non-toxic to humans, and particularly adapted for use as low temperature plasticizers in plastic compositions such as ethyl cellulose. Certain of the compounds have also been found to have valuable properties as insecticidal toxicants.

The new compounds are conveniently prepared by reacting together an alpha-arylethyl-phenol and a lower di-(chloroalkyl) ether in the presence of aqueous alkali. For example, in preparing the beta-(alpha-phenylethyl-phenoxy)-beta'-chlorodiethyl ether, a mixture of alpha-phenylethyl-phenol, beta, beta'-dichloro-diethyl ether, sodium hydroxide, and water is heated to a temperature at which reaction takes place. Regardless of the proportions of the phenol and dichlorodiethyl ether employed in the reaction, a mixture of the desired compound and of beta, beta'-di-(alpha-phenylethylphenoxy)-diethyl ether is formed. In order that the mono-ether compound be obtained in high yield, an excess of the beta,beta'-dichloro-diethyl ether is preferably employed. While the reaction may be carried out at any suitable temperature, it is convenient to operate at the boiling temperature of the mixture under reflux and at atmospheric pressure. The time required for carrying out the reaction can be somewhat reduced by operating at higher temperature and under autogeneous pressure. Following completion of the reaction, the mixture is cooled, washed with water or dilute acid, and the desired ether compound separated therefrom as by fractional distillation.

The alpha-arylethyl-phenols employed in the reaction are prepared by reacting an alpha-arylethyl halide such as alpha-phenylethyl bromide, alpha-(halo-phenyl)-ethyl chloride, alpha-(alkyl-phenyl)-ethyl chloride, alpha-(phenyl-phenyl)-ethyl iodide, alpha-(aralkyl-phenyl)-ethyl chloride, and the like, with a suitable phenol such as an alkyl-phenol, halo-phenol, cycloalkyl-phenol, phenyl-phenol, alkoxy-phenol, etc. The reaction is conveniently carried out simply by heating a mixture of the reactants to a temperature at which hydrogen halide is readily evolved. Such temperature depends somewhat upon the particular reactants employed but is usually between about 100° and about 200° C. If desired, the reaction may be carried out under reduced pressure or in a current of inert gas in order to facilitate removal of the hydrogen halide. Upon completion of the reaction, as indicated by the cessation of the hydrogen halide evolution, the substituted phenol product is recovered from the reaction mixture and purified by fractional distillation under reduced pressure, or by crystallization from a suitable solvent.

An alternate method of preparation for the alpha-aryl-ethyl-phenols comprises reacting styrene or a nuclear-substituted styrene with the desired phenol in the presence of an acid catalyst.

The preparation and properties of a number of the compounds employed as starting materials are described in United States Patents Nos. 2,247,403, 2,276,116, 2,276,117, 2,285,625, and 2,285,626. The applications maturing into the above patents were all copending with the present application.

The following examples describe in detail the preparation of certain individual members of the new class of compounds but are not to be construed as limiting the invention.

EXAMPLE 1.—*Beta-[(ortho, para-dichloro-alpha-phenylethyl)-phenoxy]-beta'-chloro-diethyl ether*

53.4 grams (0.2 mol) of mono-(ortho,para-dichloro-alpha-phenylethyl)-phenol boiling at 192°–197° C. at 4 mm. pressure, 143 grams (1 mol) of beta,beta'-dichloro-diethyl ether, 8.8 grams (0.22 mol) of sodium hydroxide, and 15 milliliters of water were mixed together and heated to 120°–125° C. for 3.5 hours. The crude reaction mixture was thereafter washed with a dilute solution of sulfuric acid and fractionally distilled, whereby there was obtained 58 grams of a beta-[(ortho,para-dichloro-alpha-phenylethyl)-phenoxy]-beta'-chloro-diethyl ether fraction as a viscous oil boiling between 215° C. at 2 mm. pressure and 235° C. at 3 mm. pressure, and having a specific gravity of 1.31 at 25°/25° C. This compound has the following structural formula

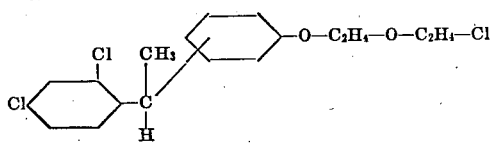

EXAMPLE 2.—*Beta-(2.6-di-alpha-phenylethyl-4-tertiarybutyl-phenoxy)-beta'-chloro-diethyl ether*

358 grams (1 mol) of 2.6-di-alpha-phenylethyl-4-tertiarybutyl-phenol boiling at 200°–215° C. at 2 mm. pressure, 715 grams (5 mols) of beta,beta'-dichloro-diethyl ether, and 136 grams (1.01 mols) of 30 per cent aqueous sodium hydroxide were mixed together and heated to 130° C. for 14 hours. The reaction mixture was thereafter cooled, washed with dilute acid, and fractionally distilled to obtain 210 grams of beta-(2.6-di-alpha-phenylethyl-4-tertiarybutyl-phenoxy)-beta'-chloro-diethyl ether as a thick oily liquid boiling at 256°–262° C. at 2 mm. pressure, and having a specific gravity of 1.07 at 25°/25° C. This compound has the formula

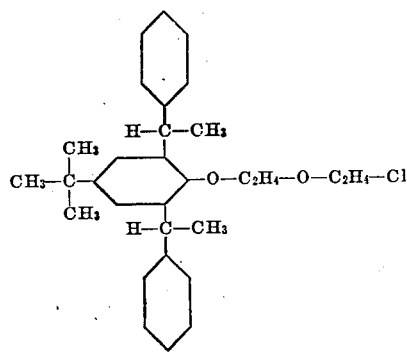

EXAMPLE 3.—*Beta-(2.4.6-tri-alpha-phenylethyl-phenoxy)-beta'-chloro-diethyl ether*

203 grams (0.5 mol) of 2.4.6-tri-alpha-phenylethyl-phenol boiling at 250°–260° at 3 mm. pressure, 500 grams (3.5 mols) of beta,beta'-dichloro-diethyl ether, and 136.5 grams (1 mol) of 30 per cent aqueous sodium hydroxide were mixed together and heated to 130° C. for 4 hours substantially as described in Example 1. The reaction mixture was thereafter cooled, washed with dilute acid, and fractionally distilled, whereby there was obtained 149 grams of beta-(2.4.6-tri-alpha-phenylethyl-phenoxy)-beta'-chloro-diethyl ether boiling at 270°–280° C. at 3 mm. pressure and having a specific gravity of 1.11 at 25°/25° C. This compound has the following formula

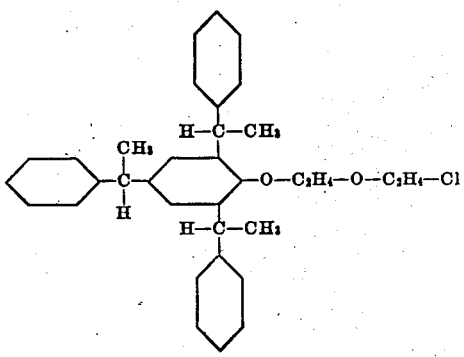

EXAMPLE 4

In a similar manner other alpha-arylethyl-substituted phenols were reacted with beta,beta'-dichloro-diethyl ether to obtain the corresponding ether compounds of the phenols, of which the following are representative:

Beta-(alpha-phenylethyl-phenoxy)-beta'-chloro-diethyl ether having the following formula

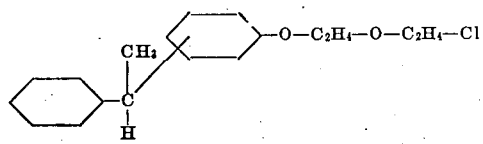

This compound was a colorless free-flowing liquid boiling at 203°–213° C. at 2.5 mm. pressure and having a specific gravity of 1.12 at 25°/25° C. It was prepared by reacting beta,beta'-dichloro-diethyl ether with mono-alpha-phenylethyl-phenol boiling at 149°–159° C. at 3 mm. pressure, and having a specific gravity of 1.09 at 25°/25° C.

Beta-[2-methoxy-mono-(para-chloro-alpha-phenylethyl)-phenoxy]-beta'-chloro-diethyl ether having the following formula

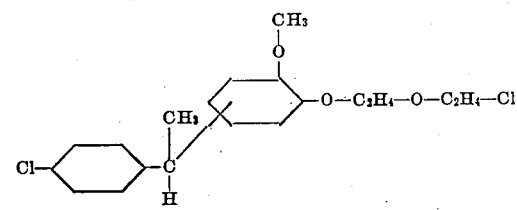

This compound is a straw-colored viscous liquid boiling at 214°–219° C. at 2 mm. pressure and having a specific gravity of 1.21 at 25°/25° C. The compound was prepared by reacting beta,beta'-dichloro-diethyl ether with 2-methoxy-mono-(para-chloro-alpha-phenylethyl)-phenol boiling at 177°–182° C. at 2 mm. pressure and having a specific gravity of 1.21 at 25°/25° C.

Beta-(2.4-di-alpha-phenylethyl-phenoxy)-beta'-chloro-diethyl ether having the formula

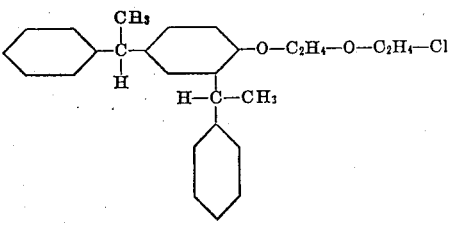

This compound is a moderately viscous oil boiling between 245° and 267° C. at 2 mm. pressure and having a specific gravity of 1.11 at 25°/25° C. It was prepared by reacting beta,beta'-dichloro-diethyl ether with 2.4-di-alpha-phenyl-ethylphenol boiling at 210°–220° C. at 2 mm. pressure and having a specific gravity of 1.08 at 25°/25° C.

Beta-(di - alpha - phenylethyl - toloxy)-beta'-chloro-diethyl ether having the formula

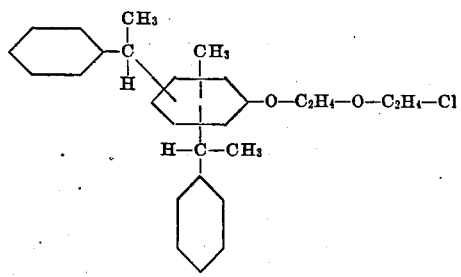

This compound is a moderately viscous oil boiling at 240°–265° C. at 2 mm. pressure and having a specific gravity of 1.10 at 25°/25° C. It was prepared by reacting beta,beta'-dichloro-diethyl ether with di-alpha-phenylethyl-cresol boiling at 206°–227° C. at 2 mm. pressure, and having a specific gravity of 1.07 at 25°/25° C.

Other phenols which may be similarly reacted to obtain compounds falling within the scope of the present invention include mono-alpha-phenylethyl-cresol boiling at 145°–160° C. at 2 mm. pressure and having a specific gravity of 1.07 at 25°/25° C.; 2-alpha-phenylethyl-4-tertiary-butyl-phenol boiling at 145°–160° C. and having a specific gravity of 1.00 at 25°/25° C.; 2.6-di-alpha-phenylethyl-4-tertiary-butyl-phenol boiling at 211°–212° C. at 2 mm. pressure and having a specific gravity of 1.03 at 25°/25° C.; 2-methoxy-alpha-phenylethyl-phenol boiling at 148°155° C. at 2 mm. pressure and having a specific gravity of 1.11 at 25°/25° C.; 2-methoxy-mono-(ortho,para-dichloro-alpha - phenylethyl)-phenol boiling at 180° C. at 2 mm. pressure; 2.4-di-alpha-phenylethyl-6-benzyl-phenol; 2.4-di-alpha-phenylethyl-3-n-hexyl-phenol; 2.4-di-alpha-phenylethyl-6-cyclohexyl-phenol; 2.6-di-alpha-phenylethyl-4-isopropoxy-phenol; 2.6-di-alpha - phenylethyl - 4 - bromo - phenol; 2.6 - di-alpha-phenylethyl-4-ethyl-phenol; 2.4-di-alpha-phenylethyl-6-chloro-phenol; 2.4-di-alpha-phenylethyl-3.5-di - methyl - phenol; 4-alpha-phenylethyl-6-ethoxy-phenol; 4-(ortho - bromo-alpha-phenylethyl) - 6 - isopropoxy - phenol; 2-(ortho, para-di-bromo-alpha - phenylethyl)-4-methoxy-phenol; 4-alpha - phenylethyl-2-n-hexoxy-phenol; 4-(para-tertiarybutyl - alpha - phenylethyl)-phenol; 2-alpha-phenylethyl-4-tertiaryamyl-phenol; 4-(para-cyclohexyl-alpha-phenylethyl)-2-cyclohexyl - phenol; 4-alpha-phenylethyl-3-secondaryhexyl - phenol; 4-alpha - phenylethyl-2-lauryl-phenol; 2-alpha-phenylethyl-4.6-di-amyl-phenol; 2-alpha-phenylethyl-4.6-di-chloro-phenol; 2-alpha-phenylethyl-4.6-di - nitro - phenol; 2-alpha-phenylethyl-4-carbethoxy-phenol; etc.

The alpha-arylethyl-substituted phenols may be reacted with lower di-(chloro-alkyl)-ethers other than beta,beta'-dichloro-diethyl ether substantially as disclosed in the examples. Representative of the ether compounds which may be so employed are beta,beta'-dichloro-dipropyl ether, gamma, gamma'-dichloro-dipropyl ether, beta,gamma' - dichloro - dipropyl ether, delta, delta'-dichloro-dibutyl ether, beta,beta'-dichloro-dibutyl ether, etc.

Other modes of applying the principle of our invention may be employed instead of those explained, change being made as regards the process or materials herein disclosed, provided the product stated by any of the following claims or the equivalent of such stated product be obtained.

We claim:

1. A compound having the formula

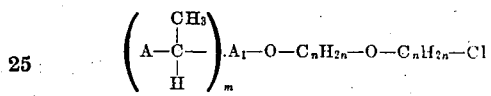

wherein A represents an aromatic radical selected from the group consisting of phenyl and phenyl radicals containing at least one of the substituents chloro, bromo, alkyl, and cyclohexyl, $A_1$ represents an aromatic radical selected from the group consisting of phenyl and phenyl radicals containing at least one of the substituents chloro, bromo, alkyl, alkoxy, benzyl, and cyclohexyl, $m$ is an integer not greater than 3, and $n$ is an integer from 2 to 4, inclusive.

2. A compound having the formula

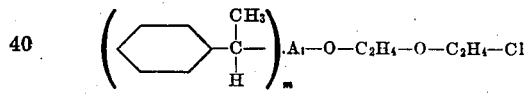

wherein $A_1$ represents an aromatic radical selected from the group consisting of phenyl and phenyl radicals containing at least one of the substituents chloro, bromo, alkyl, alkoxy, benzyl, and cyclohexyl, and $m$ is an integer not greater than 3.

3. A compound having the formula

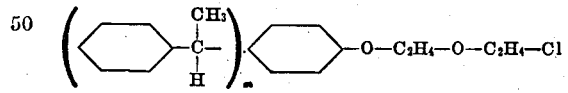

wherein $m$ is an integer not greater than 3.

FRED LOWELL TAYLOR.
CLARENCE L. MOYLE.